July 26, 1949.                    L. DE MOSS                    2,477,289
                                SKINNING MACHINE
Filed Jan. 31, 1945                                          2 Sheets-Sheet 1
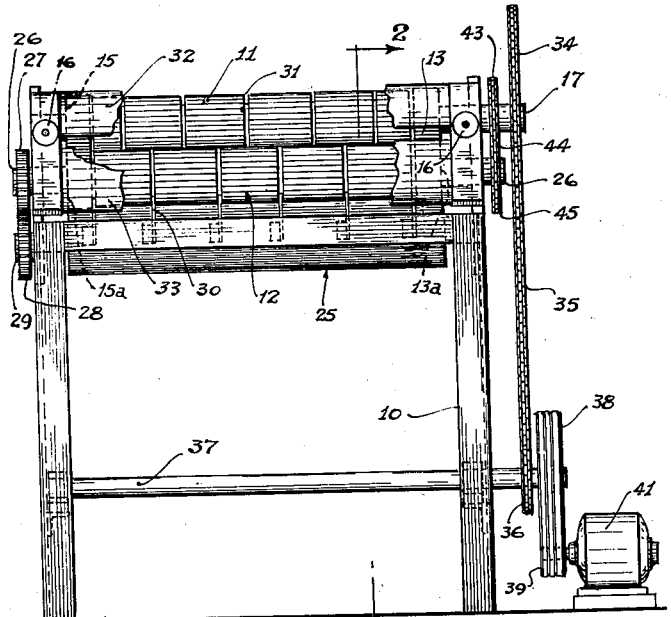
Fig. 1
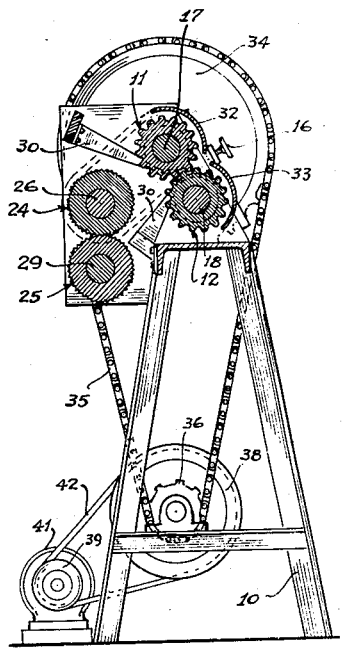
Fig. 2
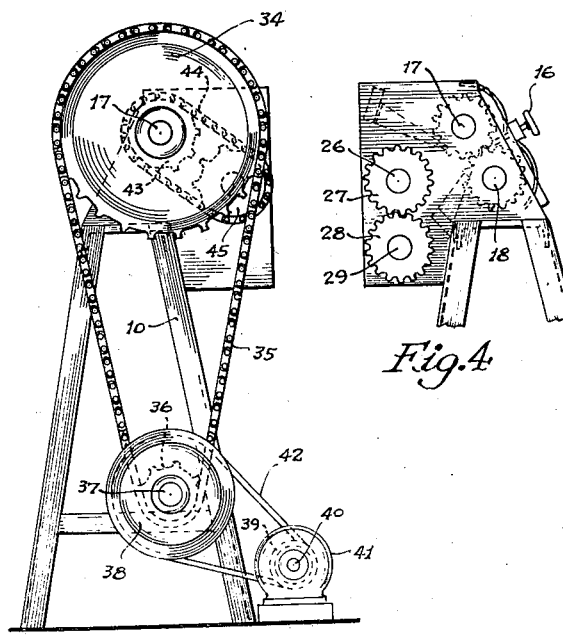
Fig. 3
Fig. 4
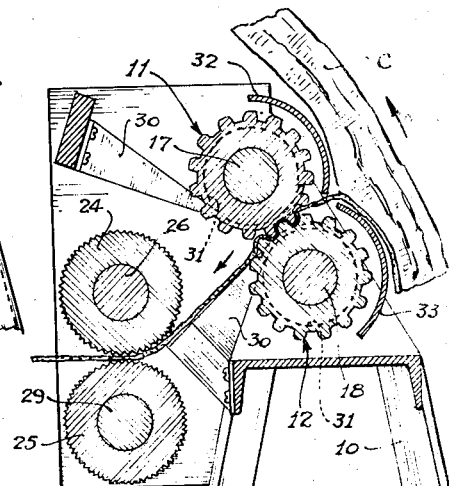
Fig. 5
INVENTOR.
Leonard De Moss
BY
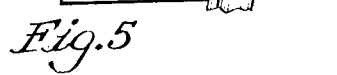
ATTORNEY Patented July 26, 1949

2,477,289

UNITED STATES PATENT OFFICE 2,477,289

SKINNING MACHINE

Leonard De Moss, Des Moines, Iowa, assignor to Swift & Company, Chicago, Ill., a corporation of Illinois Application January 31, 1945, Serial No. 575,482

17 Claims. (Cl. 17—21)

This invention relates to an apparatus for detaching and recovering the skin from pork products. More particularly it has to do with the detachment and removal of the skin from pork products like hams, shoulders, smoked bacon.

In the treatment of pork products like hams, shoulders, and smoked bacon for the removal of its rind or skin, as heretofore carried out, an end of the skin is lifted by hand from a warm or chilled pork product, and the end of the detached skin is then inserted in a clamp which draws it through a knifelike device. By this device the skin is cut from the pork product. In this operation, it so happens that in many instances patches of skin are left still attached to the pork product, and the portion of the skin that has been removed carries comparatively little of the fibrous material, usually embedded in the fat underneath the skin and adhering thereto, associated therewith. To remove both these patches of skin and the fibrous material, it is necessary for an operator to subject the pork product to a trimming or similar operation. Such operation, however, results in also the removal of some of the fat and its associated meat from the pork product.

It has been found that by employing an apparatus including a gripping means adapted to positively grip an end of the skin separated from a pork product, means permitting the progressive feeding of the raised end of said skin to said gripping means, and means for actuating said gripping means it is possible to exert upon the skin being separated a uniformly constant pulling force in a direction approximately oblique to the progressive feeding movement of said product which is of such magnitude as to result in the skin together with its adhering fibrous material and associated fat to be evenly detached in a single operation, whereby several operations and the necessity of cutting away some of the edible portion of the pork product are eliminated with a considerable saving in processing cost.

A method for accomplishing all of these desirable results is disclosed in my co-pending application, Serial No. 575,483, filed January 31, 1945, entitled "Method of skinning meat."

Accordingly, an object of the present invention is to provide an apparatus for detaching and recovering the skin from pork products wherein the skin together with its adhering fibrous material and associated fat is detached in a single pulling operation.

Another object of the present invention is to provide an apparatus for detaching and recovering the skin from pork products which results in the recovery of the detached skin carrying its adhering fibrous material and substantially free of the associated fat.

A further object of the present invention is to provide an apparatus for detaching and recovering the skin from pork products whereby the skin with its adhering fibrous material and associated fat is detached from the pork product in a commercially feasible and practical manner.

A still further object of the present invention is to provide an apparatus for detaching and recovering the skin from pork products in which the skin together with its adhering fibrous material and associated fat is detached from the pork product in a single operation and the associated fat recovered from the detached skin.

Other objects and advantages will be apparent as the invention is described in greater detail in connection with the accompanying drawings wherein:

Figure 1 is a front elevational view, with parts broken away, of the apparatus for carrying out the present invention.

Figure 2 is a sectional view taken on the line 2—2 of Figure 1.

Figure 3 is an end view of the apparatus shown in Figure 1, taken from the drive mechanism end.

Figure 4 is an end view of only the roll assembly of the apparatus shown in Figure 1, taken from the end opposite that of the drive mechanism.

Figure 5 is an enlarged end sectional view of only the roll assembly illustrating the manner in which pork products are treated therein in accordance with the apparatus of the present invention.

Figure 7:
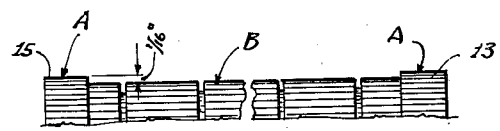
Figure 7 illustrates that the portion of the skin detaching roll intermediate the drive ends thereof is slightly lower than said ends.

Referring to the drawings, the numeral 10 indicates a frame, Figure 1, on which is mounted a means adapted to exert a pulling force, such means as shown in said figure embodying a pair of corrugated rolls 11 and 12 rotatably mounted in said frame. Each of rolls 11 and 12, Figure 7, at each end thereof is provided with a grooved portion indicated by the letter A which constitutes a gear section, both of said grooved portions A being slightly higher than the intermediate portion designated by the letter B. This intermediate portion B of each of the rolls 11 and 12 produces a greater clearance in this area of the assembled rolls than in the end portions A. The importance of such clearance will be subsequently described.

Carried by a shaft 17 of the roll 11, Figure 1, adjacent one end thereof, is a gear 13 which meshes with a gear 13a carried by the complemental end of a shaft 18 of the roll 12. The opposite end of the shaft 17 carries a gear 15 which meshes with a gear 15a carried by the complemental end of the shaft 18 of the roll 12. Mounted adjacent the rolls 11 and 12 are guard members 32 and 33 positioned adjacent and partially surrounding said rolls and mounted on the frame by means of screws 16. As will be apparent from Figures 2 and 4, the mounting of the guard members 32 and 33 is such as to form a slot therebetween.

Figure 6:
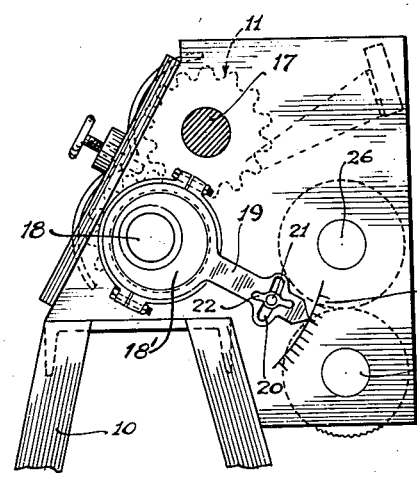
Figure 6 is an enlarged end view of a modification of the apparatus shown in Figure 1 showing additional means for adjusting the skin detaching rolls relative to each other.

Mounted on both ends of shaft 18, adjacent the frame 10, is shown means for adjusting the pair of corrugated rolls 11 and 12. (See Figure 6.) A bracket 19 is provided with an elongated slot 20 through which extends an end of a bolt 21 provided with a wing nut 22. The extending free end of the bracket 19 is pointed, and is arranged in cooperative relation with a graduated scale 23. The bracket 19 is fixed to a bearing support 18' that is rotatably mounted in the frame of the machine. The bearing support 18' carries the shaft 18 of roll 12, and the shaft is mounted eccentrically within the rotatable support 18'. An identical structure is provided on the other side of the machine to cooperate with the other end of shaft 18. By loosening the wing nut 22, and then shifting the bracket in the desired direction, the roll 12 may be shifted relative to the roll 11. When shifted to the desired position as indicated by the pointed end of the bracket 19 on the scale 23, the wing nut is again tightened. By this adjustment the clearance between the intermediate portions of the rolls 11 and 12 is increased or decreased within certain limits.

While the means adapted to exert a pulling force embodying the pair of corrugated rolls 11 and 12 thus described is preferred, it is to be understood that a single knurled roller in association with a shoe, may be employed in place of such rolls 11 and 12 with good results.

Rotatably mounted in the frame 10 and to the rear of the rolls 11 and 12, Figure 5, are a pair of rolls 24 and 25, each of said rolls being provided with serrated peripheral surfaces. Carried by a shaft 26 of the roll 24, Figure 1, adjacent one end thereof, is gear 27, which meshes with a gear 28 carried by the complemental end of a shaft 29 of the roll 25.

Although the pair of rolls 24 and 25 and the associated actuating mechanism thus described are shown as a part of the apparatus of the present invention, such rolls and its associated actuating mechanism may be omitted from the apparatus where the recovery of the fat from the detached skin is not desired.

Carried by the outer end of the shaft 17 of the roll 11, Figures 1 and 3, is a sprocket wheel 34 which is driven by means of a sprocket chain 35 in meshing engagement with a sprocket wheel 36 carried by a shaft 37 journaled in the frame 10. Journaled on the shaft 37 is a pulley 38 which is driven by a pulley 39 carried by the shaft 40 of a motor 41 by means of a V belt 42.

Journaled on the end of the shaft 17 of the roll 11 inwardly of the sprocket wheel 34 is a sprocket wheel 43 which cooperates with a chain 44 in meshing engagement with a sprocket wheel 45 carried by the complemental end of the shaft 26 of the roll 24.

Figure 9:
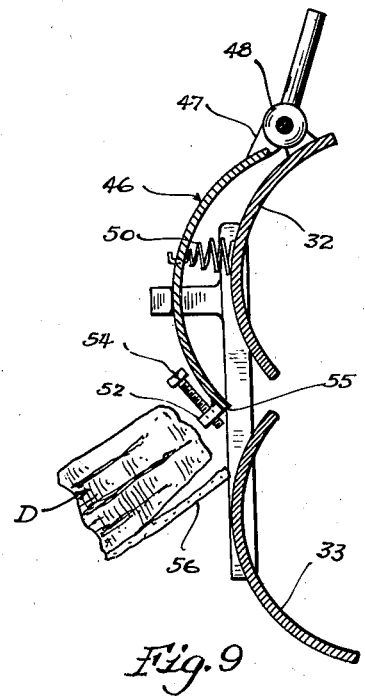
Figure 9 is an enlarged end sectional view of the guard members and yieldable scraping member assembly only, taken on line 9—9 of Figure 8 illustrating the manner in which a slab of bacon is treated therein.
Figure 8:
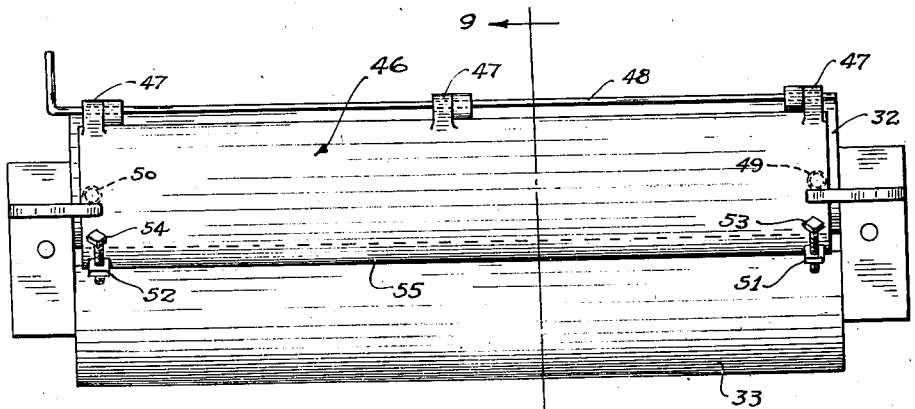
Figure 8 is an enlarged front elevational view of only the guard members embracing the roll assembly of the apparatus shown in Figure 1, but including as a modification the yieldable scraping member arranged in operative relation with such guard members.

Referring to the modification shown in Figures 8 and 9, a yieldable or flexible scraping member 46 is disposed in operative relation with respect to the guard members 32 and 33. Such scraping member is detachably secured to a hanger 47 by means of a rod 48. The scraping member 46 is maintained at a spaced distance from the guard members 32 and 33 and is normally urged outward therefrom by means of springs 49 and 50. Depending from the exterior surface of the lower portion of the scraping member 46 adjacent each of its ends are threaded lugs 51 and 52 for the reception of an end of threaded bolts 53 and 54. The bolts 53 and 54 may be so set as to adjust the clearance between the scraping edge 55 and the guard members 32 and 33 when in full depressed position. In place of the springs 49 and 50 being underneath the scraping member 46 they may be attached to the top of the scraping member and to an arm carried by the frame of the machine, this manner of the mounting of the springs likewise maintaining the scraping member normally in open position with respect to the guard members.

For the treatment of pork products such as either hams, shoulders, or smoked bacon in the apparatus according to the present invention, an end of the skin of the pork product to be treated is raised by either cutting the edge of the skin with a hand knife or by means of a band or circular knife device. If desired, the pork products may be previously chilled or cooled to a temperature of between 26° and 42° Fahrenheit.

With the rolls 11 and 12 adjusted so as to provide a clearance such as to prevent chewing up of the detached skin in its passage therebetween, and the motor 41 actuated to set the apparatus in operation, a ham, shoulder or smoked bacon slab is placed in contact with the guard members 32 and 33, and while so supported the raised end of the skin of the ham, shoulder, or smoked bacon slab is inserted through the slot formed between the guard members. The end thus inserted is next pushed forwardly until it is gripped by the corrugated rolls 11 and 12. By the rotation of the rolls 11 and 12 a continuous and uniformly constant pulling force is caused to be exerted upon the skin while in gripping relation with said rolls. As the detached skin, Figure 5, is being discharged from the rolls 11 and 12 the ham, shoulder, or smoked bacon slab designated by the letter C, Figure 5, is caused to be moved upwardly and such movement continued until all of the skin has been detached from the ham, shoulder, or smoked bacon slab. This pulling force exerted upon the skin by the rotation of the rolls while the ham, shoulder, or smoked bacon slab is being progressively fed upwardly tends to rotate the ham, shoulder, or smoked bacon slab, thereby creating a pulling force in a direction approximately oblique to the progressive feeding movement of the pork product being skinned. Such pulling force results in the detachment of the skin together with its adhering fibrous material which is embedded in the fat directly beneath the skin.

The detached skin upon being discharged from the rolls 11 and 12 is then fed into rolls 24 and 25, guard fingers 30 being provided to prevent skins from remaining on rolls 11 and 12 as they move forward. The fingers 30 extend into grooves 31 of rolls 11 and 12 as shown in Figures 1 and 5. During the passage of the skin through such rolls, the fat associated with the underlying fibrous material is separated therefrom. Thus, this separation of the fat from the detached skin may be termed a defatting step, or operation. After passage through the rolls 24 and 25, the defatted skin is discharged therefrom and collected for subsequent disposition. As hereinabove pointed out, this defatting operation of the detached skin may, if desired, be omitted by merely removing the rolls 24 and 25 and its associated actuating mechanism from the apparatus.

Upon completion of the detachment of skin from the ham or shoulder, the ham or shoulder is removed from the guard members 32 and 33, another ham or shoulder with an end of the skin raised is then placed upon the guard members, and the operation previously described is repeated.

Ofttimes, it may be desirable to employ the modification of the apparatus shown in Figures 8 and 9 for the treatment of smoked bacon in place of the apparatus hereinabove described. In this case the shoulder end or ham end of a slab of bacon is inserted into a band or circular knife device so as to raise an end of the skin.

With the rolls 11 and 12 adjusted so as to provide a clearance such as to prevent chewing up of the detached skin in its passage therebetween, the bolts 53 and 54 so adjusted as to provide the desired clearance between the scraping edge 55 of the scraping member 46 and that of the guard members 32 and 33 when in full depressed position, and the motor actuated to set the apparatus in operation, a slab of bacon designated by the letter D, Figure 9, is placed in contact with the guard member 33, and while so supported the raised end 56 of the skin is advanced to a point such that it will contact with the top portion of the guard member 33. At this point the slab of bacon bears against the scraping member and the raised end 56 of the skin is being inserted through the slot formed between the guard members. The slab of bacon is next pushed forwardly until the end of the detached skin is gripped by the corrugated rolls 11 and 12. As the detached skin is being moved into gripping relation with the rolls 11 and 12 the slab of bacon bears against the scraping member and moves it to fully depressed position. By the rotation of the rolls 11 and 12 a continuous and uniformly constant pulling force is caused to be exerted upon the skin while in gripping relation with said rolls, and simultaneously the scraping edge 55 of the scraping member acting in conjunction with the guard member 33 permits the skin, together with its adhering fibrous material and carrying only the relatively small amount of fat in which such fibrous material is embedded, to pass through the slot between the guard members 32 and 33. As the detached skin is being discharged from the rolls 11 and 12, the bacon slab designated by the letter D is caused to be moved upwardly and such movement continued until all of the skin has been detached from the bacon slab. This pulling force exerted upon the skin by the rotation of the rolls while it is being fed progressively upwardly tends to rotate the slab, thereby creating a pulling force in a direction approximately oblique to the progressive feeding movement of the bacon slab being skinned. Such pulling force results in the detachment of the skin together with its adhering fibrous material which is embedded in the fat directly beneath the skin. The detached skin may, if desired, be then subjected to the defatting step or operation previously described.

Although the invention has been described in connection with the detachment of the skin from ham, shoulder or smoked bacon, it is to be understood that it is equally effective for removing the skin from other pork products like bellies, neck fat, and back fat.

Obviously, many modifications and variations of the invention hereinbefore specifically described may be made without departing from the scope and spirit thereof, and, therefore, only such limitations should be imposed as are indicated in the appended claims.

I claim:

1. A universal machine for skinning pork products such as hams, bellies, shoulders and the like having a tab of skin formed thereon, comprising a driven skin engaging means to pull the skin and its adhering fibrous plugs off the product, means to drive said pulling means, a meat supporting means operatively associated with said pulling means and having an aperture therein, means for relatively fixedly mounting said supporting means with the aperture positioned forwardly of the pulling means with respect to the movement of the skin through the machine so that after the tab of skin has been fed through said aperture into engagement with the pulling means, the product is drawn across the supporting means as the skin passes into the aperture in the supporting means during performance of the skinning operation.

2. A universal machine for skinning pork products such as hams, bellies, shoulders and the like having a tab of skin formed thereon, comprising a pair of loosely interfitting gear-shaped rollers to engage and pull the skin and its adhering fibrous plugs off the product, means to drive said rollers, a meat-supporting means operatively associated with said pulling means and having an aperture therein, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and the skin is turned sharply away from the product as the skin passes into the aperture in the supporting means during performance of the skinning operation.

3. A universal machine for skinning pork products such as hams, bellies, shoulders and the like having a tab of skin formed thereon, comprising a driven skin-engaging means to pull the skin and its adhering fibrous plugs off the product, the pulling means being arranged to tightly engage the skin with a crushing force, means to drive said pulling means, a meat-supporting means operatively associated with said pulling means and having an aperture therein, means for relatively fixedly mounting said supporting means with the aperture positioned forwardly of the pulling means with respect to the movement of the skin through the machine, so that after the tab of skin has been fed through said aperture into engagement with the pulling means, the product is drawn across the supporting means and the skin is turned sharply away from the product as the skin passes into the aperture in the supporting means during performance of the skinning operation, and serrated means to engage the crushed skin to flesh it as it passes from the machine.

4. A universal machine for skinning pork products such as hams, bellies, shoulders and the like having a tab of skin formed thereon, comprising a driven skin engaging means to pull the skin and its adhering fibrous plugs off the product, the pulling means being arranged to tightly engage the skin with a crushing force, means to drive said pulling means, a meat supporting means operatively associated with said pulling means and having an aperture therein, means for relatively fixedly mounting said supporting means with the aperture positioned forwardly of the pulling means with respect to the movement of the skin through the machine, so that after the tab of skin has been fed through said aperture into engagement with the pulling means, the product is drawn across the supporting means and the skin is turned sharply away from the product as the skin passes into the aperture in the supporting means during performance of the skinning operation, and a pair of cooperating serrated rollers to engage the crushed skin to flesh it as it passes from the machine.

5. A universal machine for skinning pork products such as hams, bellies, shoulders and the like having a tab of skin formed thereon, comprising a pair of loosely interfitting gear-shaped rollers to engage and pull the skin and its adhering fibrous plugs off the product, said rollers tightly engaging the skin therebetween to crush it, means to drive said rollers, a meat supporting means operatively associated with said pulling means and having an aperture therein, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and the skin is turned sharply away from the product as the skin passes into the aperture in the supporting means during performance of the skinning operation, and a pair of cooperating serrated rollers to engage the crushed skin to flesh it as it passes from the machine.

6. A universal machine for skinning pork products such as hams, bellies, shoulders and the like having a tab of skin formed thereon, comprising a driven skin engaging means to pull the skin and its adhering fibrous plugs off the product, means to drive said pulling means, a meat-supporting means operatively associated with said pulling means and having an aperture therein, the surface of said support being inwardly turned toward the pulling means adjacent the aperture, means for relatively fixedly mounting said supporting means with the aperture positioned forwardly of the pulling means with respect to the movement of the skin through the machine, so that after the tab of skin has been fed through said aperture into engagement with the pulling means, the product is drawn against the supporting means and the skin is turned sharply away from the product as the skin passes into the aperture in the supporting means during performance of the skinning operation.

7. A universal machine for skinning pork products such as hams, bellies, shoulders and the like having a tab of skin formed thereon, comprising a pair of loosely interfitting gear-shaped rollers to engage and pull the skin and its adhering fibrous plugs off the product, means to drive said rollers, a pair of meat-supporting members operatively associated with said pulling means, said members being curved to fit closely over the perifery of said rollers, means for relatively fixedly mounting said supporting members, one of each being closely adjacent each of the rollers and forwardly of the pulling rollers with respect to the movement of the skin through the machine, said members being spaced apart to provide an aperture forwardly of the line of junction of said interfitting rollers, the arrangement being such that after the tab of skin has been fed through said aperture into engagement with the rollers, the product is drawn against the supporting means and the skin is turned sharply away from the product as the skin passes into the aperture in the supporting means during performance of the skinning operation.

8. A universal machine for skinning pork products such as hams, bellies, shoulders and the like having a tab of skin formed thereon, comprising a pair of loosely interfitting gear-shaped rollers to engage and pull the skin and its adhering fibrous plugs off the product, means to drive said rollers, a pair of meat-supporting members operatively associated with said pulling means, said members being curved to fit closely over the perifery of said rollers, means for relatively fixedly mounting said supporting members, one of each being closely adjacent each of the rollers and forwardly of the pulling rollers with respect to the movement of the skin through the machine, said members being spaced apart to provide an aperture forwardly of the line of junction of said interfitting rollers, the arrangement being such that after the tab of skin has been fed through said aperture into engagement with the rollers, the product is drawn against the supporting means and the skin is turned sharply away from the product as the skin passes into the aperture in the supporting means during performance of the skinning operation, and a pair of cooperating serrated rollers to engage the crushed skin to flesh it as it passes from the machine.

9. A universal machine for skinning and defatting the skin of pork products such as hams, bellies, shoulders and the like having a tab of skin formed thereon, comprising a driven skin engaging means to pull the skin and its adhering fibrous plugs off the product, means to drive said pulling means, a meat-supporting means operatively associated with said pulling means and having an aperture therein, a scraper resiliently mounted on the supporting means in front of the aperture, means for relatively fixedly mounting said supporting means with the aperture positioned forwardly of the pulling means with respect to the movement of the skin through the machine, so that after the tab of skin has been fed through said aperture into engagement with the pulling means and with the fat side of the skin in contact with the scraper, the product is drawn across the supporting means and the skin is turned sharply away from the product as the skin passes into the aperture in the supporting means during performance of the skinning operation, and free fat on the surface of the skin is removed therefrom by the scraper.

10. A universal machine for skinning and defatting the skin of pork products such as hams, bellies, shoulders and the like having a tab of skin formed thereon, comprising a pair of loosely interfitting gear-shaped rollers to engage and pull the skin and its adhering fibrous plugs off the product, means to drive said rollers, a meat-supporting means operatively associated with said pulling means and having an aperture therein, a scraper resiliently mounted on the supporting means in front of the aperture, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and the skin is turned sharply away from the product as the skin passes into the aperture in the supporting means during performance of the skinning operation, and the free fat on the surface of the skin is removed therefrom by the scraper while the fat adhering to the skin is crushed by the pulling rollers whereby it can be then more easily removed.

11. A universal machine for skinning and defatting the skin of pork products such as hams, bellies, shoulders and the like having a tab of skin formed thereon, comprising a pair of loosely interfitting gear-shaped rollers to engage and pull the skin and its adhering fibrous plugs off the product, said rollers tightly engaging the skin therebetween to crush it, means to drive said rollers, a meat-supporting means operatively associated with said pulling means and having an aperture therein, a scraper resiliently mounted on the supporting means in front of the aperture, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and skin is turned sharply away from the product as the skin passes into the aperture in the supporting means during performance of the skinning operation, and a pair of cooperating serrated rollers to engage the crushed skin to flesh it whereby the skin is removed from the cut and is substantially stripped of all fat adhering thereto by the cooperating scraping, crushing, and fleshing means.

12. A universal machine for skinning pork products such as hams, bellies, shoulders and the like having a tab of skin formed thereon, comprising a pair of loosely interfitting gear-shaped rollers to engage and pull the skin and its adhering fibrous plugs off the product, said rollers being mounted so that the distance between their centers may be adjusted, means to drive said rollers, a meat-supporting means operatively associated with said pulling means and having an aperture therein, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and the skin is turned sharply away from the product as the skin passes into the aperture in the supporting means during performance of the skinning operation.

13. A universal machine for skinning and defatting the skin of pork products such as hams, bellies, shoulders and the like having a tab of skin formed thereon, comprising a pair of loosely interfitting gear-shaped rollers to engage and pull the skin and its adhering fibrous plugs off the product, said rollers tightly engaging the skin therebetween to crush it, and said rollers being mounted so that the distance between their centers may be adjusted to provide the desired tight skin engagement, means to drive said rollers, a meat-supporting means operatively associated with said pulling means and having an aperture therein, a scraper resiliently mounted on the supporting means in front of the aperture, means for relatively fixedly mounting said supporting means with the aperture positioned forwardly of the pulling means with respect to the movement of the skin through the machine, so that after the tab of skin has been fed through said aperture into engagement with the rollers, the product is drawn across the supporting means and the skin is turned sharply away from the product as the skin passes into the aperture in the supporting means during performance of the skinning operation, and a pair of cooperating serrated rollers to engage the crushed skin to flesh it whereby the skin is removed from the cut and is substantially stripped of all fat adhering thereto by the cooperating scraping, crushing, and fleshing means.

14. A universal machine for skinning pork products such as ham, bellies, shoulders, and the like, having a tab of skin formed thereon, comprising a driven skin engaging means to pull the skin and its adhering fibrous plugs off the product, driving means operatively connected to said skin engaging means, meat supporting means operatively associated with said pulling means and positioned adjacent one side of said pulling means, said supporting means having an aperture therein through which the tab may project from the product to be engaged by said pulling means, and mounting means for said supporting means and said pulling means.

15. A universal machine for skinning pork products such as hams, bellies, shoulders, and the like, having a tab of skin formed thereon, comprising a driven skin engaging means to pull the skin and its adhering fibrous plugs off the product, said pulling means including a toothed roller and means to hold the skin in engagement with the roller, driving means operatively connected to said skin engaging means, meat supporting means operatively associated with said pulling means and positioned adjacent one side of said pulling means, said supporting means having an aperture therein through which the tab may project from the product to be engaged by said pulling means, and mounting means for said supporting means and said pulling means.

16. A universal machine for skinning pork products such as hams, bellies, shoulders, and the like, having a tab of skin formed thereon, comprising a driven skin engaging means to pull the skin and its adhering fibrous plugs off the product, driving means operatively connected to said skin engaging means, meat supporting means operatively associated with said pulling means and positioned adjacent one side of said pulling means, said supporting means having an aperture therein through which the tab may project from the product to be engaged by said pulling means, aperture varying means to control the scraping action of the edge of the supporting means on the skin as the skin is drawn through the aperture, and mounting means for said supporting means and said pulling means.

17. A universal machine for skinning pork products such as hams, bellies, shoulders, and the like, having a tab of skin formed thereon, comprising a driven skin engaging means to pull the skin and its adhering fibrous plugs off the product, said pulling means including a toothed roller and means to hold the skin in engagement with the roller, driving means operatively connected to said skin engaging means, meat supporting means operatively associated with said pulling means and positioned adjacent one side of said pulling means, said supporting means having an aperture therein through which the tab may project from the product to be engaged by said pulling means, aperture varying means to control the scraping action of the edge of the supporting means on the skin as the skin is drawn through the aperture, and mounting means for said supporting means and said pulling means.

LEONARD DE MOSS.

REFERENCES CITED

The following references are of record in the file of this patent:

UNITED STATES PATENTS

| Number | Name | Date |
|---|---|---|
| 1,703,217 | Watson | Feb. 26, 1929 |
| 1,878,457 | Berry | Sept. 20, 1932 |
| 1,960,643 | Lorenzen | May 29, 1934 |
| 2,455,831 | Townsend | Dec. 7, 1948 |